United States Patent
Takeuchi et al.

(10) Patent No.: US 11,251,817 B2
(45) Date of Patent: Feb. 15, 2022

(54) RADIO FREQUENCY MODULE AND COMMUNICATION DEVICE

(71) Applicant: Murata Manufacturing Co., Ltd., Nagaokakyo (JP)

(72) Inventors: Morio Takeuchi, Nagaokakyo (JP); Motoji Tsuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/110,321

(22) Filed: Dec. 3, 2020

(65) Prior Publication Data
US 2021/0175911 A1 Jun. 10, 2021

(30) Foreign Application Priority Data
Dec. 9, 2019 (JP) .............................. JP2019-222439

(51) Int. Cl.
*H04B 1/04* (2006.01)
(52) U.S. Cl.
CPC ....... *H04B 1/04* (2013.01); *H04B 2001/0408* (2013.01)
(58) Field of Classification Search
CPC ......... H01L 21/84; H01L 23/60; H01L 24/16; H01L 25/16; H03C 1/62; H03F 1/56; H03F 3/19; H03F 3/21; H03F 3/24; H03F 3/195; H03F 2200/267; H03F 2200/294; H03F 2200/451; H04B 1/00; H04B 1/04; H04B 1/16; H04B 1/28; H04B 1/38; H04B 1/44; H04B 1/48; H04B 1/0053; H04B 1/0057; H04B 1/0475; H04B 17/00; H04B 200/0408; H04M 1/02; H04M 1/0277

USPC ........ 333/129, 132, 133; 375/262, 295–297; 455/82, 115.1, 127.1, 323, 333, 522
See application file for complete search history.

(56) References Cited

U.S. PATENT DOCUMENTS

2005/0245212 A1* 11/2005 Ono ..................... H03G 3/3047
455/127.1
2018/0096951 A1* 4/2018 Chen ....................... H01L 23/66
2018/0131501 A1 5/2018 Little
(Continued)

FOREIGN PATENT DOCUMENTS

KR 2019-0117660 A 10/2019
WO 2018/168500 A1 9/2018

OTHER PUBLICATIONS

Office Action dated Dec. 22, 2021, in corresponding Korean patent Application No. 10-2020-0157350, 9 pages.

*Primary Examiner* — Shawkat M Ali
(74) *Attorney, Agent, or Firm* — Xsensus LLP

(57) ABSTRACT

A radio frequency module includes: a module board including a first principal surface and a second principal surface on opposite sides of the module board; a power amplifier configured to amplify a radio frequency transmission signal that has been input through a transmission input terminal; a low noise amplifier configured to amplify a radio frequency reception signal; a switch disposed on the second principal surface and connected between the transmission input terminal and the power amplifier; and an inductor of a matching circuit connected to an input terminal of the low noise amplifier. In the radio frequency module, at least one of the low noise amplifier or the inductor is disposed on the first principal surface.

18 Claims, 6 Drawing Sheets

(56) References Cited

U.S. PATENT DOCUMENTS

2020/0007096 A1    1/2020   Kita
2020/0020645 A1    1/2020   Nakajima

* cited by examiner

RADIO FREQUENCY MODULE AND COMMUNICATION DEVICE

CROSS REFERENCE TO RELATED APPLICATION

The present application is based on and claims priority to Japanese Patent Application No. 2019-222439 filed on Dec. 9, 2019. The entire disclosure of the above-identified application, including the specification, drawings and claims is incorporated herein by reference in its entirety.

TECHNICAL FIELD

The present disclosure relates to a radio frequency (RF) module and a communication device.

BACKGROUND

In mobile communication devices such as a mobile phone, the arrangement configuration of circuit elements included in radio frequency front-end circuits is becoming complex, particularly with developments in multiband technologies.

U.S. Patent Application Publication No. 2018/0131501 discloses a configuration of a front-end circuit including two power amplifiers each of which amplifies a transmission signal. The front-end circuit includes a switch on the input side of the two power amplifiers. The switch switches between inputting transmission signals from two transceiver circuits to one of the two power amplifiers and inputting the transmission signals to the other of the two power amplifiers. According to this configuration, two transmission signals output from the above-described two transceiver circuits can be transmitted with high isolation from two antennas via the above-described front-end circuit.

SUMMARY

Technical Problems

However, when the front-end circuit disclosed by U.S. Patent Application Publication No. 2018/0131501 is configured in a single module as a small-sized front-end circuit, it is expected that electric field coupling, magnetic field coupling, or electromagnetic field coupling occurs between the above-described switch and a radio frequency component included in a reception circuit. In this case, isolation characteristics between a transmission circuit and the reception circuit are deteriorated.

In view of the above-described circumstances, the present disclosure is presented to provide a radio frequency module and a communication device that are capable of reducing deterioration of the isolation characteristics between the transmission circuit and the reception circuit as well as reducing the size.

Solutions

A radio frequency module according to one aspect of the present disclosure includes: a module board including a first principal surface and a second principal surface on opposite sides of the module board; a power amplifier configured to amplify a radio frequency transmission signal that has been input through a transmission input terminal; a low noise amplifier configured to amplify a radio frequency reception signal; a switch disposed on the second principal surface and connected between the transmission input terminal and the power amplifier; and an inductor connected to an input terminal of the low noise amplifier. In the radio frequency module, at least one of the low noise amplifier or the inductor is disposed on the first principal surface.

Advantageous Effects

With the radio frequency module according to one aspect of the present disclosure, it is possible to reduce deterioration of the isolation characteristics between the transmission circuit and the reception circuit as well as reducing the size of the radio frequency module.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

The following describes in detail an embodiment and variations of the embodiment of the present disclosure with reference to the drawings. Each of the embodiment and the variations of the embodiment described below illustrates a general or specific example. The numerical values, shapes, materials, structural components, the arrangement and connection of the structural components, and so on, illustrated in the following embodiment and the variations of the embodiment are mere examples, and therefore do not limit the present disclosure.

It should be noted that, each of the diagrams is a schematic diagram to which an emphasis, an omission, or an adjustment of ratios has been applied as appropriate to illustrate the present disclosure, and thus is not necessarily strictly illustrated. There are instances where the shapes, positional relationships, and ratios illustrated in the diagrams are different from the actual shapes, actual positional relationships, and actual ratios. In each of the diagrams, substantially the same structural components are denoted by the same reference signs, and redundant description may be omitted or simplified.

In each of the diagrams described below, the X-axis and the Y-axis are orthogonal to each other on a plane parallel to the principal surface of the module board. In addition, the Z-axis is perpendicular to the principal surface of the module board. The positive direction of the Z-axis indicates an upward direction and the negative direction of the Z-axis indicates a downward direction.

In addition, the following describes the meaning of the terms used in the present disclosure.

The meaning of "to be connected" includes not only to be directly connected via a connection terminal and/or a line conductor, but also to be electrically connected via other circuit elements.

The meaning of "to be directly connected" is to be directly connected via a connection terminal and/or a line conductor without interposition of other circuit elements.

Terms indicating the relationships between elements such as "parallel" and "perpendicular" and terms indicating the shapes of the elements such as a "quadrilateral shape", and numerical ranges do not represent only the strict meanings but include also a substantially equivalent range, such as a difference of approximately several percent.

The meaning of "in a plan view" is to view an object by orthographically projecting the object on the XY-plane from the Z-axis positive side.

The meaning of "A overlap B in a plan view of a module board" is that, in a plan view of the module board, a region of A projected overlaps a region of B projected.

Furthermore, as used herein the terms "circuit" or "circuitry" means one or more circuits, including discrete circuit (s) as well as circuit board(s) and combinations thereof.

EMBODIMENT

Figure 1:
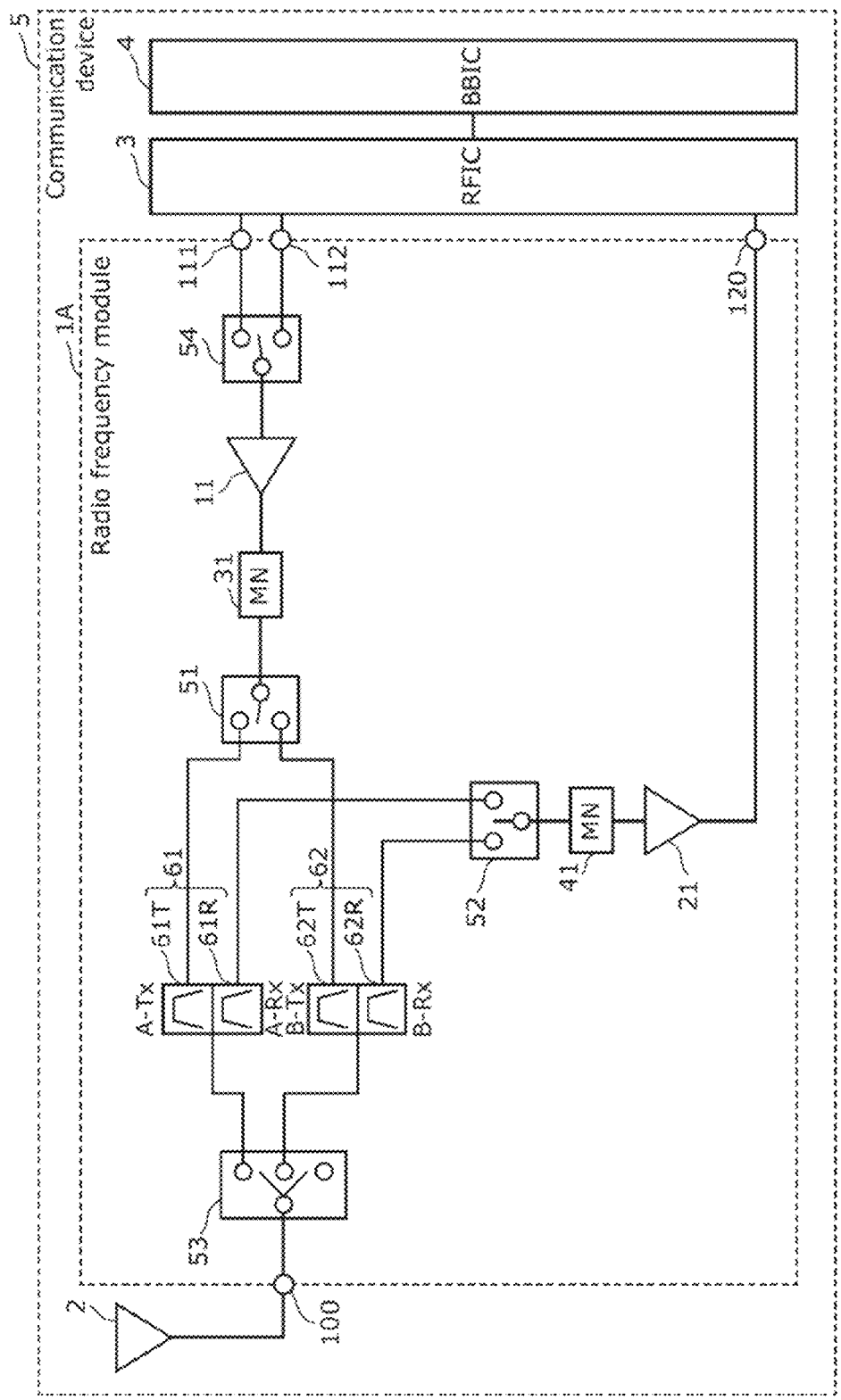
FIG. 1 is a diagram illustrating a circuit configuration of a communication device according to an embodiment.
Figure 2:
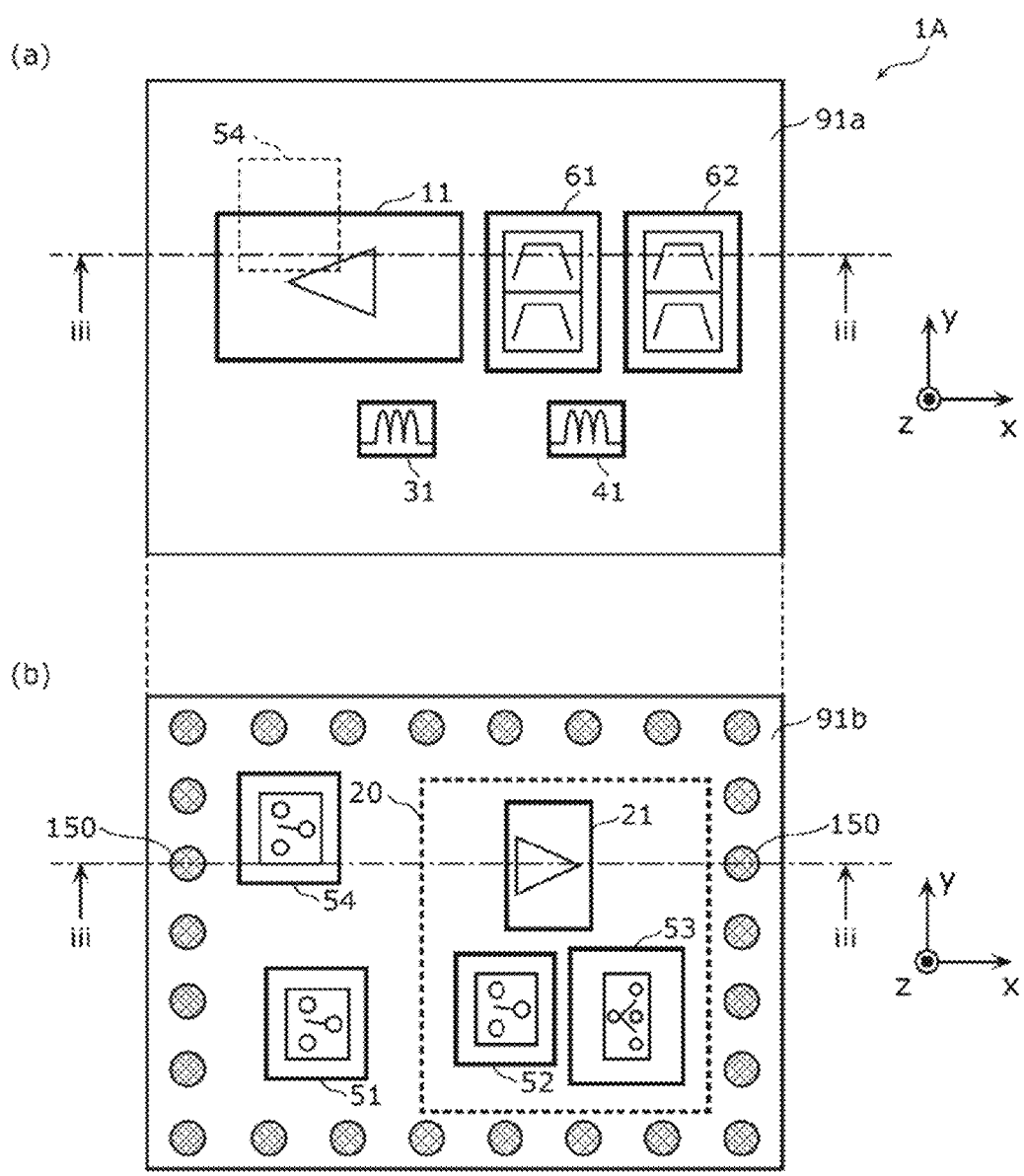
FIG. 2 illustrates a plan view of the radio frequency module according to the embodiment.
Figure 3:
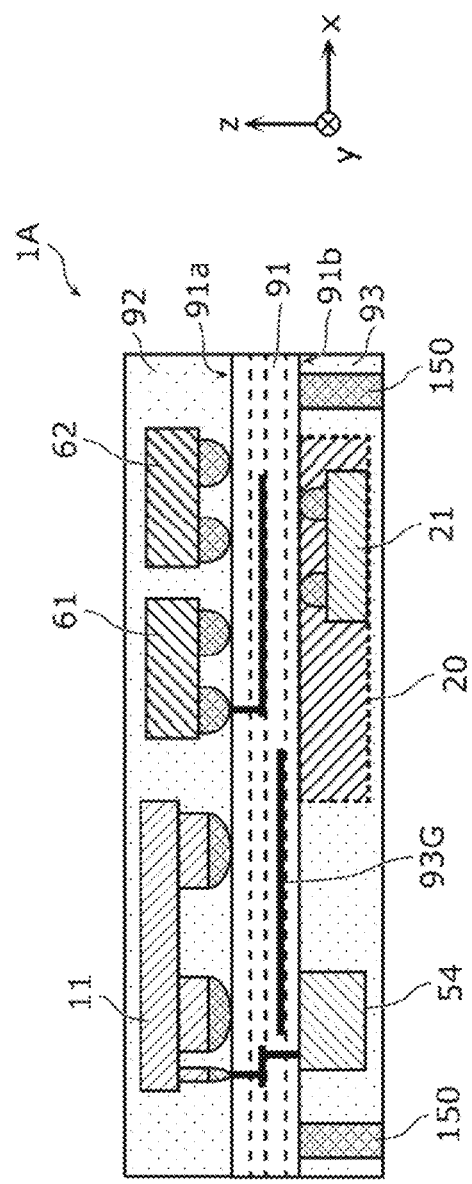
FIG. 3 illustrates a cross-sectional view of the radio frequency module according to the embodiment.

The following describes an embodiment with reference to FIG. 1 to FIG. 3.

1.1. Circuit Configurations of Radio Frequency Module 1A and Communication Device 5

The following describes circuit configurations of radio frequency module (or RF front-end circuitry) 1A and communication device 5 according to the present embodiment. FIG. 1 illustrates a circuit configuration of radio frequency module 1A and communication device 5 according to the embodiment.

1.1.1. Circuit Configuration of Communication Device 5

First, a circuit configuration of communication device 5 will be described in detail with reference to FIG. 1. As illustrated in FIG. 1, communication device 5 includes radio frequency module 1A, antenna 2, RFIC 3, and BBIC 4.

In this exemplary configuration, the communication device is a multi-band transceiver. As used in this specification the term "module", as used with "radio frequency module" should be construed as circuitry (programmable, as well as discrete) and associated circuit components, such as circuit boards, RF shielding, etc.

Radio frequency module 1A transfers a radio frequency signal between antenna 2 and RFIC 3. A detailed circuit configuration of radio frequency module 1A will be described later.

Antenna 2 is connected to antenna connection terminal 100 of radio frequency module 1A. Antenna 2 emits a radio frequency signal that has been output from radio frequency module 1A, and receives a radio frequency signal from the outside and outputs the received radio frequency signal to radio frequency module 1A.

RFIC 3 is one example of a signal processing circuit that processes a radio frequency signal to be transmitted by antenna 2 and a radio frequency signal received by antenna 2. More specifically, RFIC 3 performs signal processing, by down-conversion or the like, on a radio frequency reception signal that has been input via a reception signal path of radio frequency module 1A, and outputs the reception signal generated by the signal processing to BBIC 4. In addition, RFIC 3 performs signal processing, by up-conversion or the like, on a transmission signal that has been input from BBIC 4, and outputs the transmission signal generated by the signal processing to a transmission signal path of radio frequency module 1A.

BBIC 4 is a baseband signal processing circuit that performs signal processing using an intermediate frequency band including frequencies lower than frequencies of a radio frequency signal that is transferred through radio frequency module 1A. The signal processed by BBIC 4 is, for example, used as an image signal for image display or as a sound signal for telephone conversation via a speaker.

RFIC 3 also controls the connection of switches 51 to 54 included in radio frequency module 1A, based on a communication band used. In addition, RFIC 3 transfers a control signal for adjusting a gain, etc. of power amplifier 11 of radio frequency module 1A, to radio frequency module 1A.

It should be noted that communication device 5 according to the present embodiment need not necessarily include antenna 2 and BBIC 4. In other words, antenna 2 and BBIC 4 are not indispensable components for the communication device according to the present disclosure.

1.1.2. Circuit Configuration of Radio Frequency Module 1A

Next, a circuit configuration of radio frequency module 1A will be described in detail with reference to FIG. 1. As illustrated in FIG. 1, radio frequency module 1A includes: power amplifier 11; low noise amplifier 21; matching circuits 31 and 41; switches 51 to 54; duplexers 61 and 62; antenna connection terminal 100; transmission input terminals 111 and 112; and reception output terminal 120.

Power amplifier 11 is one example of a power amplifier that amplifies a radio frequency signal that has been input through a transmission input terminal. Here, power amplifier 11 amplifies a radio frequency transmission signal that has been input thereto from transmission input terminals 111 and/or 112 via switch 54. For example, power amplifier 11 amplifies radio frequency transmission signals of communication band A and/or communication band B.

Low noise amplifier 21 is one example of a low noise amplifier that amplifies a radio frequency reception signal. Here, low noise amplifier 21 amplifies a radio frequency reception signal and outputs the amplified radio frequency reception signal to reception output terminal 120. For example, low noise amplifier 21 amplifies radio frequency reception signals of communication band A and/or communication band B with low noise.

Duplexer 61 passes a radio frequency signal of communication band A. Duplexer 61 transfers a transmission signal and a reception signal of communication band A in a frequency division duplex (FDD) system. Duplexer 61 includes transmission filter 61T and reception filter 61R.

Transmission filter 61T is connected between power amplifier 11 and antenna connection terminal 100. Transmission filter 61T passes a transmission signal in a transmission band of communication band A among the transmission signals that have been amplified by power amplifier 11.

Reception filter 61R is connected between low noise amplifier 21 and antenna connection terminal 100. Reception filter 61R passes a reception signal in a reception band of communication band A among the reception signals that have been input through antenna connection terminal 100.

Duplexer 62 passes a radio frequency signal of communication band B. Duplexer 62 transfers a transmission signal and a reception signal of communication band B in the FDD system. Duplexer 62 includes transmission filter 62T and reception filter 62R.

Transmission filter 62T is connected between power amplifier 11 and antenna connection terminal 100. Transmission filter 62T passes a transmission signal in a transmission band of communication band B among the transmission signals that have been amplified by power amplifier 11.

Reception filter 62R is connected between low noise amplifier 21 and antenna connection terminal 100. Reception filter 62R passes a reception signal in a reception band of communication band B among the reception signals that have been input through antenna connection terminal 100.

Matching circuit 31 is connected between power amplifier 11 and transmission filters 61T and 62T, and is directly connected to an output terminal of power amplifier 11. Matching circuit 31 matches the impedance of power amplifier 11 with the impedance of transmission filters 61T and 62T.

Matching circuit 41 is one example of an inductor connected to an input terminal of a low noise amplifier. Here, matching circuit 41 is connected between low noise amplifier 21 and reception filters 61R and 62R, and is directly connected to the input terminal of low noise amplifier 21. Matching circuit 41 matches the impedance of low noise amplifier 21 with the impedance of reception filters 61R and 62R.

Switch 51 is connected between power amplifier 11 and transmission filters 61T and 62T. More specifically, switch 51 includes a common terminal and two selection terminals. The common terminal of switch 51 is connected to power amplifier 11 via matching circuit 31. A first selection terminal that is one of two selection terminals of switch 51 is connected to transmission filter 61T, and a second selection terminal that is the other of the two selection terminals of switch 51 is connected to transmission filter 62T. With this connection configuration, switch 51 switches connection of the common terminal between the first selection terminal and the second selection terminal. In other words, switch 51 is a band selection switch that switches connection of power amplifier 11 between transmission filter 61T and transmission filter 62T. Switch 51 is implemented as, for example, a single pole double throw (SPDT) switching circuit.

Switch 52 is connected between low noise amplifier 21 and reception filters 61R and 62R. More specifically, switch 52 includes a common terminal and two selection terminals. The common terminal of switch 52 is connected to low noise amplifier 21 via matching circuit 41. A first selection terminal that is one of two selection terminals of switch 52 is connected to reception filter 61R, and a second selection terminal that is the other of the two selection terminals of switch 52 is connected to reception filter 62R. With this connection configuration, switch 52 switches connection of the common terminal between the first selection terminal and the second selection terminal. In other words, switch 52 is a low noise amplifier (LNA) IN switch that switches connection of low noise amplifier 21 between reception filter 61R and reception filter 62R. Switch 52 is implemented as, for example, an SPDT switching circuit.

Switch 53 is connected between antenna connection terminal 100 and duplexers 61 and 62. More specifically, switch 53 includes a common terminal and at least two selection terminals. The common terminal of switch 53 is connected to antenna connection terminal 100. A first selection terminal that is one of the at least two selection terminals of switch 53 is connected to duplexer 61, and a second selection terminal that is the other of the at least two selection terminals of switch 53 is connected to duplexer 62. With this connection configuration, switch 53 connects and disconnects the common terminal and the first selection terminal, and connects and disconnects the common terminal and the second selection terminal. More specifically, switch 53 is an antenna switch that connects and disconnects antenna 2 and duplexer 61, and connects and disconnects antenna 2 and duplexer 62. Switch 53 is implemented as, for example, a multiple-connection switching circuit.

Switch 54 is one example of a switch connected between a transmission input terminal and a power amplifier. Here, switch 54 is connected between power amplifier 11 and transmission input terminals 111 and 112. More specifically, switch 54 includes a common terminal and two selection terminals. The common terminal of switch 54 is connected to power amplifier 11. The two selection terminals of switch 54 are respectively connected to transmission input terminals 111 and 112. With this connection configuration, switch 54 switches connection of the common terminal between one of the two selection terminals and the other of the two selection terminals. More specifically, switch 54 is a power amplifier (PA) IN switch that switches connection of power amplifier 11 between transmission input terminal 111 and transmission input terminal 112. Switch 54 is implemented as, for example, an SPDT switching circuit.

Radio frequency signals of, for example, mutually different communication bands (e.g., communication band A and communication band B) are respectively input to transmission input terminals 111 and 112. Alternatively, for example, radio frequency signals of mutually different communication systems may be respectively input to transmission input terminals 111 and 112. As the mutually different communication systems, for example, a combination of the fourth generation mobile communication system (4G) and the fifth generation mobile communication system (5G) can be used. However, the combination is not limited to this example. For example, a combination of 4G and a wireless LAN communication system (WLAN), or a combination of 5G and WLAN may be used.

It should be noted that one or some of the circuit elements illustrated in FIG. 1 need not necessarily be included in radio frequency module 1A. For example, it is sufficient if radio frequency module 1A includes at least power amplifier 11, low noise amplifier 21, switch 54, and matching circuit 41, and radio frequency module 1A need not necessarily include the other circuit elements.

With the circuit configuration of radio frequency module 1A, a transmission signal and a reception signal can be communicated in the FDD system. However, the circuit configuration of the radio frequency module according to the present disclosure is not limited to this example. For example, the radio frequency module according to the present disclosure may include a circuit configuration with which it is possible to perform communication of a transmission signal and a reception signal in a time division duplex (TDD) system, or may include a circuit configuration with which it is possible to perform communication of a transmission signal and a reception signal in both the FDD system and the TDD system.

1.2. Arrangement of Circuit Components of Radio Frequency Module 1A

Next, an arrangement of the circuit components of radio frequency module 1A according to the above-described configuration will be described in detail with reference to FIG. 2 and FIG. 3.

FIG. 2 illustrates a plan view of radio frequency module 1A according to the embodiment. In FIG. 2, (a) illustrates principal surface 91a of module board 91 viewed from the Z-axis positive side, and (b) illustrates principal surface 91b of module board 91 viewed from the Z-axis positive side. It should be noted that, in (a), only switch 54 among the circuit components disposed on principal surface 91b is illustrated by a broken line. FIG. 3 illustrates a cross-sectional view of radio frequency module 1A according to the embodiment. The cross-sectional view of radio frequency module 1A illustrated in FIG. 3 shows a cross-sectional surface taken along line iii-iii of FIG.

As illustrated in FIG. 2 and FIG. 3, radio frequency module 1A further includes module board 91, resin components 92 and 93, and a plurality of post electrodes 150, in addition to the circuit components that include circuit elements illustrated in FIG. 1. It should be noted that illustration of resin components 92 and 93 is omitted in FIG. 2.

Module board 91 is one example of a module board including a first principal surface and a second principal surface on opposite sides thereof. Here, module board 91 includes principal surface 91a and principal surface 91b on opposite sides thereof. As module board 91, for example, a printed circuit board (PCB), a low temperature co-fired ceramic (LTCC) board, a resin multi-layer board, or the like can be used. However, the examples of module board 91 are not limited to these examples.

Principal surface 91a is one example of a first principal surface, and is referred to as an upper surface or a front surface in some cases. As illustrated in (a) in FIG. 2, power amplifier 11, matching circuits 31 and 41, and duplexers 61 and 62 are disposed on principal surface 91a.

Each of matching circuits 31 and 41 includes at least one inductor, and may further include at least one capacitor. Each of matching circuits 31 and 41 is implemented using, for example, one or more surface mount devices (SMDs) or an integrated passive device (IPD).

Each of duplexers 61 and 62 is implemented by an acoustic wave filter using a surface acoustic wave (SAW), an acoustic wave filter using a bulk acoustic wave (BAW), an LC resonant filter, a dielectric filter, or an arbitrary combination thereof, but not limited to these filters.

Principal surface 91b is one example of a second principal surface, and is referred to as a lower surface or a rear surface in some cases. As illustrated in (b) in FIG. 2, low noise amplifier 21 and switches 51 to 54 are disposed on principal surface 91b.

Low noise amplifier 21 and switches 52 and 53 are built-in in a semiconductor integrated circuit (IC) 20 disposed on principal surface 91b. Semiconductor IC 20 is configured by, for example, a complementary metal oxide semiconductor (CMOS). Specifically, semiconductor IC 20 is manufactured through a silicon on insulator (SOI) process. This allows manufacturing semiconductor IC 20 at low manufacturing cost. It should be noted that semiconductor IC 20 may include at least one of GaAs, SiGe, or GaN. With this, it is possible to output a radio frequency signal having a high-quality amplification performance and noise performance.

Each of switches 51 and 54 is not built-in in semiconductor IC 20 but mounted on principal surface 91b as one circuit component. It should be noted that switch 51 and/or switch 54 may be built-in in semiconductor IC 20.

In a plan view of module board 91, a footprint of switch 54 at least partially overlaps a footprint of power amplifier 11. In addition, in a plan view of module board 91, a footprint of switch 54 does not overlap a footprint of low noise amplifier 21 or a footprint of the inductor of matching circuit 41.

Module board 91 includes ground electrode patterns 93G. Ground electrode patterns 93G are located between switch 53 and matching circuit 41. It should be noted that the location of ground electrode patterns 93G is not limited to this example.

The plurality of post electrodes 150 are each one example of an external-connection terminal. Each of the plurality of post electrodes 150 is disposed on principal surface 91b of module board 91, and extends perpendicularly from principal surface 91b. In addition, each of the plurality of post electrodes 150 penetrates through resin component 93, and one end thereof is exposed from resin component 93. One end of each of the plurality of post electrodes 150 exposed from resin component 93 is connected to an input/output terminal and/or a ground electrode, etc. on a motherboard located on the Z-axis negative side of radio frequency module 1A.

Resin component 92 is disposed on principal surface 91a of module board 91, and covers the circuit components on principal surface 91a. Resin component 93 is disposed on principal surface 91b of module board 91, and covers the circuit components on principal surface 91b. Resin components 92 and 93 each have a function of ensuring reliability such as a mechanical strength and moisture resistance of the circuit components disposed on principal surfaces 91a and 91b.

It should be noted that radio frequency module 1A need not necessarily include resin components 92 and 93. In other words, resin components 92 and 93 are not indispensable components for the radio frequency module according to the present disclosure.

In addition, radio frequency module 1A may include a shielding electrode layer that covers an upper surface and side surfaces of resin component 92. The shielding electrode layer is capable of inhibiting an exogenous noise from entering the circuit components included in radio frequency module 1A, by being set to a ground potential.

1.3. Advantageous Effects, Etc.

As described above, radio frequency module 1A according to the present embodiment includes: module board 91 including principal surface 91a and principal surface 91b on opposite sides of module board 91; power amplifier 11 configured to amplify a radio frequency transmission signal that has been input through transmission input terminal 111 and/or 112; low noise amplifier 21 configured to amplify a radio frequency reception signal; switch 54 connected between transmission input terminals 111 and 112 and power amplifier 11; and matching circuit 41 connected to an input terminal of low noise amplifier 21. In radio frequency module 1A according to the present embodiment, at least one of low noise amplifier 21 or matching circuit 41 is disposed on principal surface 91a, and switch 54 is disposed on principal surface 91b.

In addition, communication device 5 according to the present embodiment includes: RFIC 3 configured to process radio frequency signals transmitted and received by antenna 2; and radio frequency module 1A configured to transfer the radio frequency signals between antenna 2 and RFIC 3.

According to the-above described configuration, it is possible to dispose switch 54, low noise amplifier 21, and matching circuit 41 separately on both sides of module board 91. Accordingly, it is possible to make the area of module board 91 smaller compared to the case where all of the circuit components are disposed on one side. As a result, it is possible to realize miniaturization of radio frequency module 1A. In addition, it is possible to dispose switch 54 for transferring a radio frequency transmission signal on a principal surface different from a principal surface on which low noise amplifier 21 and/or matching circuit 41 for transferring a radio frequency reception signal are disposed. Accordingly, it is possible to reduce magnetic field coupling, electric field coupling, or electromagnetic field coupling between switch 54 and low noise amplifier 21 and/or matching circuit 41. As a result, it is possible to improve the isolation characteristics between the transmission circuit and the reception circuit.

In addition, for example, radio frequency module 1A according to the present embodiment may further include an external-connection terminal (post electrode 150) disposed on principal surface 91b, and matching circuit 41 may be disposed on principal surface 91a.

According to the-above described configuration, it is possible to dispose switch 54 on principal surface 91b on which the external-connection terminal is disposed. Accordingly, it is possible to reduce the length of a line between switch 54 and the external-connection terminal connected to RFIC 3. As a result, it is possible to reduce a mismatching loss due to a wiring loss or wiring variation, and to improve electrical characteristics (e.g., noise figure (NF), gain characteristics, etc.) of radio frequency module 1A. In addition, under the condition that an SMD inductor is used in matching circuit 41, it is possible to dispose an inductor having a relatively large height on principal surface 91a. As a result, it is possible to reduce the height of the external-connection terminal compared to the case where an inductor is disposed on principal surface 91b, and to realize a reduction in the height of radio frequency module 1A.

In addition, for example, in radio frequency module 1A according to the present embodiment, low noise amplifier 21 may be disposed on principal surface 91b.

According to the-above described configuration, it is possible to dispose low noise amplifier 21 on principal surface 91b on which switch 54 is disposed. As a result, it is possible to improve the degree of freedom in the component arrangement.

In addition, for example, in radio frequency module 1A according to the present embodiment, switch 54 and low noise amplifier 21 may be included in a single semiconductor IC 20.

According to the-above described configuration, it is possible to include switch 54 and low noise amplifier 21 in a single chip. As a result, it is possible to realize reduction of the number of components and miniaturization of radio frequency module 1A.

In addition, for example, in radio frequency module 1A according to the present embodiment, power amplifier 11 may be disposed on principal surface 91a.

According to the-above described configuration, it is possible to dispose power amplifier 11 on principal surface 91a that is the opposite side of principal surface 91b on which low noise amplifier 21 and the external-connection terminal are disposed. Accordingly, it is possible to dispose power amplifier 11 and low noise amplifier 21 on mutually different principal surfaces. As a result, it is possible to reduce magnetic field coupling, electric field coupling, or electromagnetic field coupling between power amplifier 11 and low noise amplifier 21, and thus the isolation characteristics between the transmission circuit and the reception circuit can be improved. In addition, it is possible to improve the heat dissipation property of power amplifier 11.

In addition, for example, in radio frequency module 1A according to the present embodiment, in a plan view of module board 91, a footprint of switch 54 may at least partially overlap a footprint of power amplifier 11.

According to the-above described configuration, it is possible to reduce the length of a line between switch 54 and power amplifier 11. As a result, it is possible to reduce a mismatching loss due to a wiring loss or wiring variation, and to improve electrical characteristics of radio frequency module 1A.

In addition, for example, in radio frequency module 1A according to the present embodiment, in a plan view of module board 91, a footprint of switch 54 does not overlap a footprint of low noise amplifier 21 or a footprint of matching circuit 41.

According to the-above described configuration, it is possible to further reduce magnetic field coupling, electric field coupling, or electromagnetic field coupling between switch 54 and low noise amplifier 21 and between switch 54 and matching circuit 41. As a result, it is possible to further improve the isolation characteristics between the transmission circuit and the reception circuit.

Variation 1

Next, Variation 1 will be described. The present variation is different from the above-described embodiment mainly in that switch 54 is disposed on principal surface 91a and matching circuit 41 is disposed on principal surface 91b. The following describes in detail radio frequency module 1B according to the present variation with reference to FIG. 4, focusing on the difference from the above-described embodiment.

Figure 4:
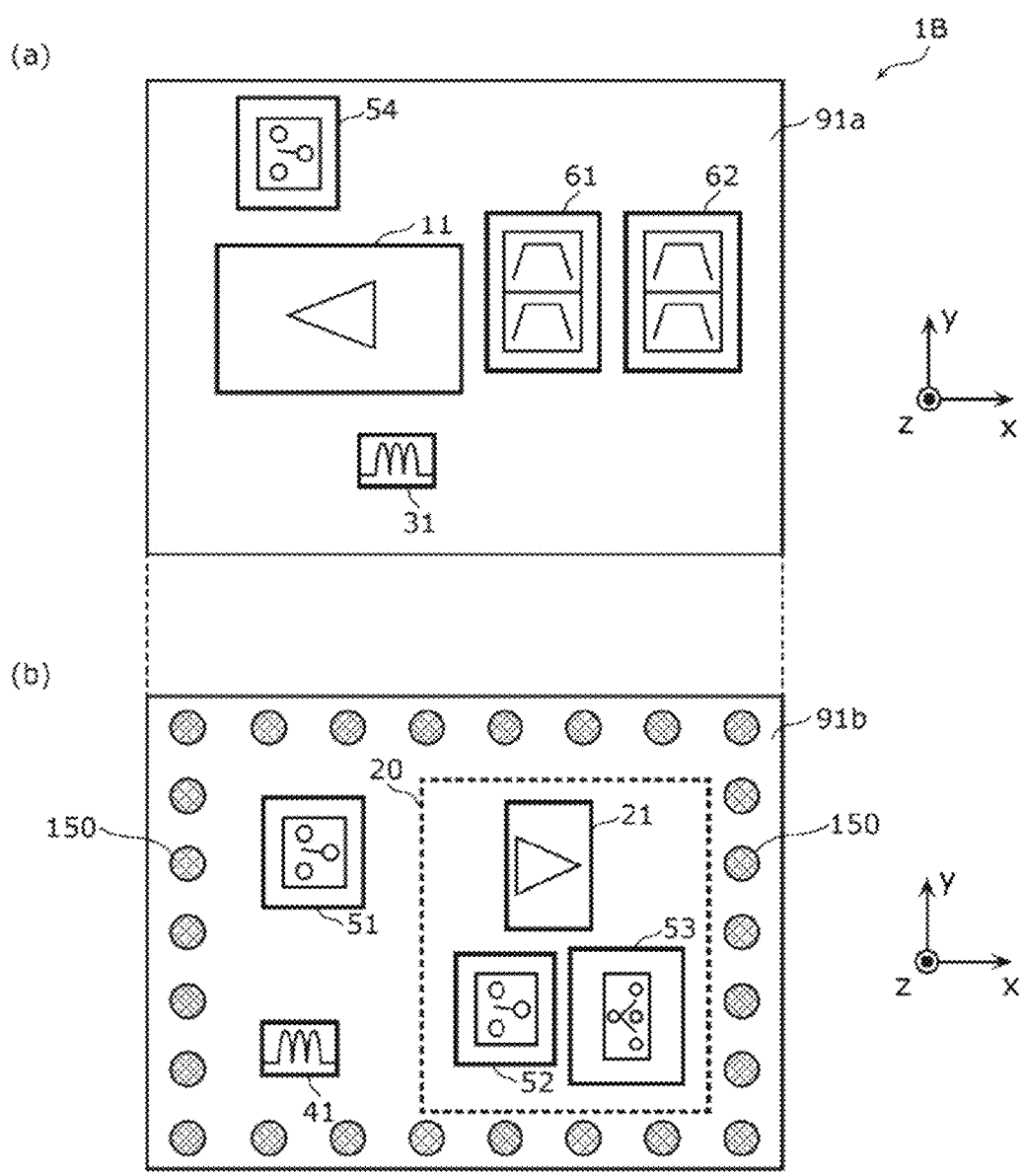
FIG. 4 illustrates a plan view of a radio frequency module according to Variation 1 of the embodiment.

FIG. 4 illustrates a plan view of radio frequency module 1B according to Variation 1. In FIG. 4, illustration of resin components 92 and 93 is omitted as with FIG. 2.

Module board 91 according to the present variation is one example of a module board including a first principal surface and a second principal surface on opposite sides thereof as with the above-described embodiment. Here, module board 91 includes principal surface 91a and principal surface 91b on opposite sides thereof.

Principal surface 91a is one example of the second principal surface. As illustrated in (a) in FIG. 4, power amplifier 11, matching circuit 31, switch 54, and duplexers 61 and 62 are disposed on principal surface 91a.

Principal surface 91b is one example of the first principal surface. As illustrated in (b) in FIG. 4, low noise amplifier 21, matching circuit 41, and switches 51 to 53 are disposed on principal surface 91b.

As with the above-described embodiment, matching circuit 41 includes at least one inductor, and may further include at least one capacitor. However, matching circuit 41 according to the present variation is implemented using an IPD.

As described above, radio frequency module 1B according to the present variation includes: module board 91 including principal surface 91a and principal surface 91b on opposite sides of module board 91; power amplifier 11 configured to amplify a radio frequency transmission signal that has been input through transmission input terminal 111 and/or 112; low noise amplifier 21 configured to amplify a radio frequency reception signal; switch 54 connected between transmission input terminals 111 and 112 and power amplifier 11; matching circuit 41 connected to an input terminal of low noise amplifier 21; and an external-connection terminal (post electrode 150) disposed on principal surface 91b. In radio frequency module 1B according to the present variation, low noise amplifier 21 and matching circuit 41 are each disposed on principal surface 91b, and switch 54 is disposed on principal surface 91a.

According to the-above described configuration, it is possible to dispose switch 54 on principal surface 91a and dispose both of low noise amplifier 21 and matching circuit 41 on principal surface 91b that is the opposite side of principal surface 91a on which switch 54 is disposed. Accordingly, it is possible to reduce magnetic field coupling, electric field coupling, or electromagnetic field coupling between switch 54 and low noise amplifier 21 and between switch 54 and matching circuit 41. As a result, it is possible to improve the isolation characteristics between the transmission circuit and the reception circuit.

In addition, for example, in radio frequency module 1B according to the present variation, matching circuit 41 may be implemented using an integrated passive device.

According to the-above described configuration, it is possible to reduce the height of matching circuit 41 compared to the case where matching circuit 41 is implemented using one or more SMDs. As a result, it is possible to inhibit an increase in the height of radio frequency module 1B, by disposing matching circuit 41 on principal surface 91b on which the external-connection terminal is disposed.

Variation 2

Next, Variation 2 will be described. The present variation is different from the above-described embodiment mainly in that bump electrodes 160 are used as the external-connection terminals instead of post electrodes 150. The following describes in detail radio frequency module 1C according to the present variation with reference to FIG. 5, focusing on the difference from the above-described embodiment.

Figure 5:
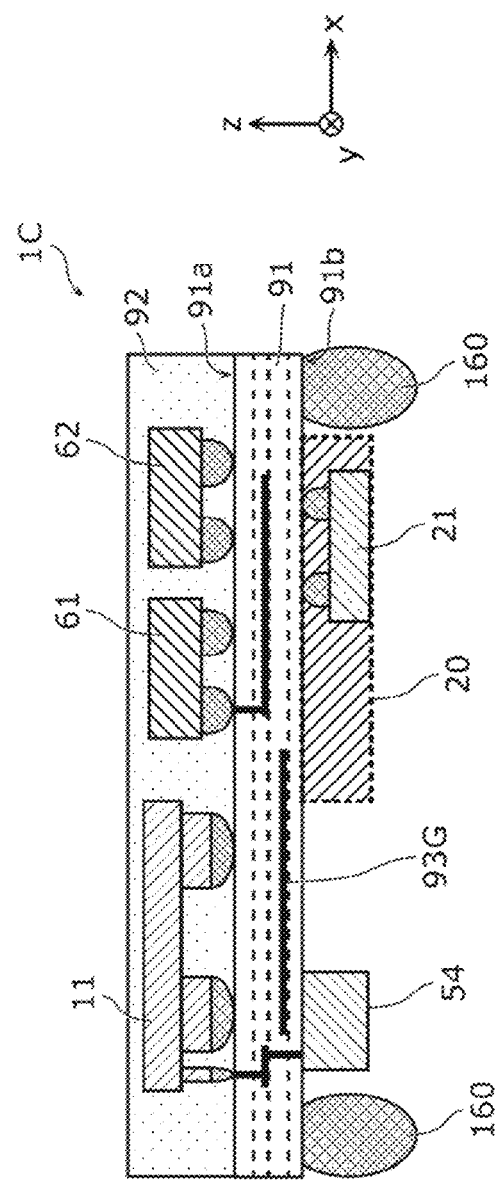
FIG. 5 illustrates a cross-sectional view of a radio frequency module according to Variation 2 of the embodiment.

FIG. 5 illustrates a cross-sectional view of radio frequency module 1C according to Variation 2. As illustrated in FIG. 5, radio frequency module 1C according to the present variation includes a plurality of bump electrodes 160 instead of the plurality of post electrodes 150.

The plurality of bump electrodes 160 are each one example of the external-connection terminal. Each of the plurality of bump electrodes 160 is disposed on principal surface 91b of module board 91 and connected to an input/output terminal and/or a ground electrode, etc. on a motherboard located on the Z-axis negative side of radio frequency module 1C.

In addition, according to the present variation, circuit components on principal surface 91b of radio frequency module 1C are not covered by a resin component.

As described above, radio frequency module 1C according to the present variation includes the plurality of bump electrodes 160 instead of the plurality of post electrodes 150. Such a configuration as described above can also yield advantageous effects equivalent to the advantageous effects described in the above-described embodiment.

Variation 3

Next, Variation 3 will be described. The present variation is different from the above-described embodiment mainly in the connection configuration of a switch connected between the transmission input terminal and the power amplifier. The following describes in detail radio frequency module 1D according to the present variation with reference to FIG. 6, focusing on the difference from the above-described embodiment.

Figure 6:
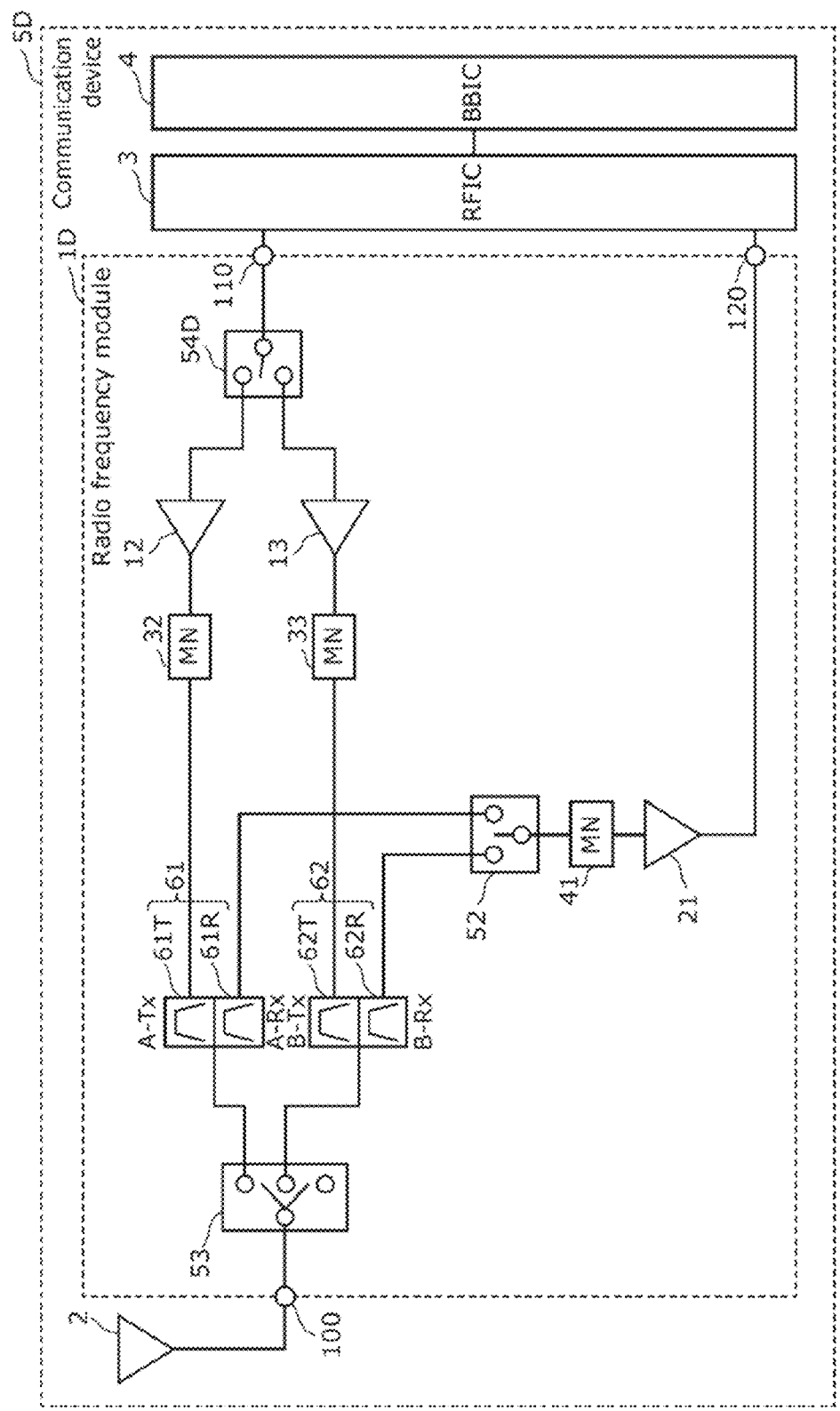
FIG. 6 is a diagram illustrating a circuit configuration of a communication device according to Variation 3 of the embodiment.

FIG. 6 is a diagram illustrating a circuit configuration of communication device 5D according to Variation 3. Communication device 5D includes radio frequency module 1D, antenna 2, RFIC 3, and BBIC 4.

Radio frequency module 1D includes: power amplifiers 12 and 13; low noise amplifier 21; matching circuits 32, 33, and 41; switches 52, 53, and 54D; duplexers 61 and 62; antenna connection terminal 100; transmission input terminal 110; and reception output terminal 120.

Power amplifiers 12 and 13 are each one example of a power amplifier that amplifies a radio frequency signal that has been input through the transmission input terminal. Here, power amplifiers 12 and 13 each amplify a radio frequency transmission signal that has been input from transmission input terminal 110 via switch 54D. More specifically, power amplifier 12 amplifies a radio frequency transmission signal of communication band A, and power amplifier 13 amplifies a radio frequency transmission signal of communication band B.

Matching circuit 32 is connected between power amplifier 12 and transmission filter 61T, and is directly connected to an output terminal of power amplifier 12. Matching circuit 32 matches the impedance of power amplifier 12 with the impedance of transmission filter 61T.

Matching circuit 33 is connected between power amplifier 13 and transmission filter 62T, and is connected to an output terminal of power amplifier 13. Matching circuit 33 matches the impedance of power amplifier 13 with the impedance of transmission filter 62T.

Switch 54D is one example of a switch connected between a transmission input terminal and a power amplifier. Here, switch 54D is connected between transmission input terminal 110 and power amplifiers 12 and 13. More specifically, switch 54D includes a common terminal and two selection terminals. The common terminal of switch 54D is connected to transmission input terminal 110. The two selection terminals of switch 54D are respectively connected to two power amplifiers 12 and 13. With this connection configuration, switch 54D switches connection of the common terminal between one of the two selection terminals and the other of the two selection terminals. More specifically, switch 54D is a PA IN switch that switches connection of transmission input terminal 110 between power amplifier 12 and power amplifier 13. Switch 54D is implemented as, for example, an SPDT switching circuit.

Radio frequency signals of, for example, mutually different communication bands are input through transmission input terminal 110. In addition, for example, radio frequency signals of mutually different communication systems may be input through transmission input terminal 110.

It should be noted that, according to the present variation, switch 54D, low noise amplifier 21, and matching circuit 41 can be arranged in a positional relationship equivalent to the positional relationship described in the above-described embodiment and Variation 1, and thus illustration and description of switch 54D, low noise amplifier 21, and matching circuit 41 will be omitted.

Other Variations

Although the radio frequency module and the communication device according to the embodiment of the present disclosure have been described above based on the embodiment and variations of the embodiment, the radio frequency module and the communication device according to the present disclosure are not limited to the foregoing embodiment and the variations of the embodiment. The present disclosure also encompasses other embodiments achieved by combining arbitrary structural components in the above-described embodiment and the variations of the embodiment, variations resulting from various modifications to the above-described embodiment and the variations of the embodiment that may be conceived by those skilled in the art without departing from the essence of the present disclosure, and various devices that include the above-described radio frequency module and the above-described communication device.

It should be noted that, according to the above-described embodiment, under the condition that switch 54 is disposed on principal surface 91b, low noise amplifier 21 is disposed on principal surface 91b, and matching circuit 41 is disposed on principal surface 91a. However, the arrangement of low noise amplifier 21 and matching circuit 41 is not limited to this example. For example, low noise amplifier 21 and matching circuit 41 may be both disposed on principal surface 91a. In addition, for example, low noise amplifier 21 may be disposed on principal surface 91a, and matching circuit 41 may be disposed on principal surface 91b.

In addition, according to the above-described Variation 1, under the condition that switch 54 is disposed on principal surface 91a, low noise amplifier 21 and matching circuit 41 are both disposed on principal surface 91b. However, the arrangement of low noise amplifier 21 and matching circuit 41 is not limited to this example. For example, one of low noise amplifier 21 and matching circuit 41 may be disposed on principal surface 91b, and the other of low noise amplifier 21 and matching circuit 41 may be disposed on principal surface 91a.

It should be noted that, in the above-described embodiment and Variation 3, either the number of the transmission input terminals or the number of the power amplifiers is one. However, the present disclosure is not limited to this example. For example, the number of the transmission input terminals and the number of the power amplifiers may be both two. In this case, the switch may include two common terminals and two selection terminals, and may switch between conduction and non-conduction between the two transmission input terminals and the two power amplifiers. In addition, at least one of the number of the transmission input terminals and the number of the power amplifiers may be three or more.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable widely to communication apparatuses such as mobile phones as a radio frequency module disposed in a multiband-compatible front-end unit.

The invention claimed is:

1. A radio frequency module, comprising:
a module board including a first principal surface and a second principal surface on opposite sides of the module board;
a power amplifier configured to amplify a radio frequency transmission signal that has been input through a transmission input terminal;
a low noise amplifier disposed on the second principal surface and configured to amplify a radio frequency reception signal;
a switch disposed on the first principal surface and connected between the transmission input terminal and the power amplifier; and
a first inductor connected to an input terminal of the low noise amplifier.

2. The radio frequency module of claim 1, further comprising:
an external-connection terminal disposed on the second principal surface.

3. The radio frequency module of claim 2, wherein
the first inductor is disposed on the first principal surface.

4. The radio frequency module of claim 1, wherein
the first inductor is disposed on the second principal surface.

5. The radio frequency module of claim 4, wherein
the first inductor is implemented using an integrated passive device.

6. The radio frequency module of claim 1, further comprising:
ground electrode patterns formed between the first principal surface and the second principal surface, wherein
in a plan view of the module board, a footprint of the ground electrode patterns at least partially overlap with a footprint of the first inductor.

7. A radio frequency module, comprising:
a module board including a first principal surface and a second principal surface on opposite sides of the module board;
an external-connection terminal disposed on the second principal surface;
a power amplifier configured to amplify a radio frequency transmission signal that has been input through a transmission input terminal;
a low noise amplifier disposed on the second principal surface and configured to amplify a radio frequency reception signal;
a switch disposed on the second principal surface and connected between the transmission input terminal and the power amplifier; and
a first inductor disposed on the first principal surface and connected to an input terminal of the low noise amplifier.

8. The radio frequency module of claim 7, wherein
the switch and the low noise amplifier are included in a single semiconductor integrated circuit (IC).

9. The radio frequency module of claim 7, wherein
in a plan view of the module board, a footprint of the switch does not overlap a footprint of the low noise amplifier or a footprint of the first inductor.

10. The radio frequency module of claim 7, further comprising:
a first duplexer configured to pass a radio frequency signal of a first band; and
a second duplexer configured to pass a radio frequency signal of a second band, which is different from the first band.

11. The radio frequency module of claim 10, wherein
the first duplexer and the second duplexer are disposed on the first principal surface.

12. The radio frequency module of claim 11, wherein
in a plan view of the module board, a footprint of the low noise amplifier at least partially overlaps a footprint of at least one of the first duplexer or the second duplexer.

13. The radio frequency module of claim 7, further comprising:
a second inductor connected to an output terminal of the power amplifier.

14. The radio frequency module of claim 13, wherein
the second inductor is disposed on the first principal surface.

15. The radio frequency module of claim 14, wherein
in a plan view of the module board, a footprint of the second inductor does not overlap a footprint of the power amplifier.

16. A radio frequency module, comprising:
a module board including a first principal surface and a second principal surface on opposite sides of the module board;

a power amplifier disposed on the first principal surface and configured to amplify a radio frequency transmission signal that has been input through a transmission input terminal;

a low noise amplifier configured to amplify a radio frequency reception signal;

a switch disposed on the second principal surface and connected between the transmission input terminal and the power amplifier;

an external-connection terminal disposed on the second principal surface; and a first inductor disposed on the first principal surface and connected to an input terminal of the low noise amplifier.

17. The radio frequency module of claim 16, wherein in a plan view of the module board, a footprint of the switch at least partially overlaps a footprint of the power amplifier.

18. A communication device, comprising:

a signal processing circuit configured to process radio frequency signals transmitted and received by an antenna; and a radio frequency module configured to transfer the radio frequency signals between the antenna and the signal processing circuit, wherein the radio frequency module comprises a module board including a first principal surface and a second principal surface on opposite sides of the module board;

an external-connection terminal disposed on the second principal surface;

a power amplifier configured to amplify a radio frequency transmission signal that has been input through a transmission input terminal;

a low noise amplifier disposed on the second principal surface and configured to amplify a radio frequency reception signal;

a switch disposed on the second principal surface and connected between the transmission input terminal and the power amplifier; and an inductor disposed on the first principal surface and connected to an input terminal of the low noise amplifier.

* * * * *